United States Patent
Agasti et al.

(10) Patent No.: US 10,380,537 B2
(45) Date of Patent: Aug. 13, 2019

(54) MERCHANDISE PICKUP SYSTEM, METHOD, AND MEDIA FOR ALLIED MERCHANTS

(71) Applicant: TRANSFORM SR BRANDS LLC, Hoffman Estates, IL (US)

(72) Inventors: Varun Reddy Agasti, Schaumburg, IL (US); Leena Munjal, Algonquin, IL (US)

(73) Assignee: TRANSFORM SR BRANDS LLC, Hoffman Estates, IL (US)

(*) Notice: Subject to any disclaimer, the term of this patent is extended or adjusted under 35 U.S.C. 154(b) by 600 days.

(21) Appl. No.: 14/286,270

(22) Filed: May 23, 2014

(65) Prior Publication Data
US 2015/0339625 A1    Nov. 26, 2015

(51) Int. Cl.
G06Q 30/00 (2012.01)
G06Q 10/08 (2012.01)
G06Q 30/06 (2012.01)

(52) U.S. Cl.
CPC ..... *G06Q 10/0836* (2013.01); *G06Q 30/0635* (2013.01)

(58) Field of Classification Search
CPC .... G06Q 10/0836; G06Q 10/08; G06Q 30/06; G06Q 30/0635; G06Q 30/0601–0645; G06Q 30/08
USPC ..................................... 705/26.1–27.2, 26.81
See application file for complete search history.

(56) References Cited

U.S. PATENT DOCUMENTS

| 6,026,375 A | 2/2000 | Hall et al. |
| 6,880,750 B2 | 4/2005 | Pentel |
| 8,200,550 B2 | 6/2012 | Altkins |
| 2001/0042024 A1* | 11/2001 | Rogers ............... G06Q 10/0637 705/26.81 |
| 2002/0035515 A1* | 3/2002 | Moreno ............... A47G 29/141 340/5.73 |

(Continued)

FOREIGN PATENT DOCUMENTS

| WO | 2004072762 | 8/2004 |
| WO | 2008014255 | 1/2008 |
| WO | 2011005072 | 1/2011 |

OTHER PUBLICATIONS

"More Casual Restaurants trying Curbside Delivery", Horovitz, May 30, 2002, retrieved from http://usatoday30.usatoday.com/money/general/2002/05/31/curbside-dining.htm (Year: 2002).*

(Continued)

*Primary Examiner* — Matthew E Zimmerman
(74) *Attorney, Agent, or Firm* — McAndrews, Held & Malloy, Ltd.

(57) ABSTRACT

Systems, methods, and apparatus are disclosed that provide a pickup process for items purchased from stores of allied merchants. In some embodiments, a customer may place an order via an e-commerce storefront that includes products from multiple merchants in a geographic region. In response to receiving the order, a merchandise pickup system may assign associates to collect the ordered products from the allied merchants and return the collected products to a pickup location. The merchandise pickup system may send a pickup notification to the customer indicating the products are ready for pickup from the pickup location.

20 Claims, 4 Drawing Sheets

(56) References Cited

U.S. PATENT DOCUMENTS

| | | | |
|---|---|---|---|
| 2002/0072945 A1* | 6/2002 | Yang | G06Q 10/06316 705/7.26 |
| 2002/0111881 A1 | 8/2002 | Walker et al. | |
| 2002/0143655 A1* | 10/2002 | Elston | G06Q 20/02 705/26.81 |
| 2004/0034571 A1* | 2/2004 | Wood | G06Q 10/08 705/26.1 |
| 2006/0076397 A1 | 4/2006 | Langos | |
| 2006/0178943 A1 | 8/2006 | Rollinson et al. | |
| 2007/0088624 A1 | 4/2007 | Vaughn et al. | |
| 2007/0106468 A1 | 5/2007 | Eichenbaum et al. | |
| 2007/0138268 A1 | 6/2007 | Tuchman | |
| 2007/0257774 A1 | 11/2007 | Stumpert et al. | |
| 2008/0228600 A1 | 9/2008 | Treyz et al. | |
| 2009/0187488 A1* | 7/2009 | Shamilian | G06Q 10/02 705/16 |
| 2009/0281903 A1 | 11/2009 | Blatstein | |
| 2010/0088148 A1 | 4/2010 | Presswala et al. | |
| 2010/0293106 A1 | 11/2010 | Rhoads et al. | |
| 2011/0055046 A1* | 3/2011 | Bowen | G06Q 10/08 705/26.41 |
| 2011/0119159 A1* | 5/2011 | Chou | G06Q 30/0613 705/27.1 |
| 2011/0130129 A1 | 6/2011 | Snyder et al. | |
| 2011/0258058 A1 | 10/2011 | Carroll et al. | |
| 2011/0288958 A1* | 11/2011 | Obasanjo | G06Q 10/08 705/26.81 |
| 2013/0073477 A1* | 3/2013 | Grinberg | A47G 29/141 705/332 |
| 2013/0096966 A1 | 4/2013 | Barnes, Jr. | |
| 2013/0262251 A1* | 10/2013 | Wan | G06Q 10/0836 705/26.1 |
| 2013/0262253 A1* | 10/2013 | Shih | G06Q 30/06 705/26.1 |
| 2014/0074743 A1* | 3/2014 | Rademaker | G06Q 50/28 705/334 |
| 2015/0206093 A1* | 7/2015 | Trew | G06Q 10/083 705/337 |
| 2015/0227882 A1* | 8/2015 | Bhatt | G06Q 10/083 705/330 |

OTHER PUBLICATIONS

Mo et al, "RFID Infrastructure for Large Scale Supply Chains Involving Small and Medium Enterprises.", In: Sustainable Radio Frequency Identification Solutions, Bok edited by: Cristina Turcu, ISBN 978-953-7619-74-9, pp. 356, Feb. 2010, INTECh, Croatia, downloaded from sciyo.com.

"More Casual Restaurants trying Curbside Delivery", Horovitz, May 30, 2002, retrieved from http://usatoday30.usatoday.com/money/general/2002/05/31/curbside-dining.htm.

"Publix Cancels Curbside Pickup", Jan. 22, 2012, retrieved from http://retailtechnologytrends.com/tag/augmented-reality, p. 8.

Collins, Galen R. "Creating Usable Mobile Ambient Intelligent Applications or Hospitality Customers." (2010).

"Retro Drive-in with Curbside Pickup", Sep. 18, 2012, retrieved from http://blog.munchery.com/2012/09/retro-drive-in-with-curbside-pickup, p. 1.

"Amazon Goods for Pickup at 7-Eleven Soon?", Apr. 23, 2014, retrieved from www.cnet.com/news/amazon-goods-for-pickup-at-7-eleven-soon, 3 pages.

"Category/AmazonFresh", May 15, 2014, retrieved from https:/fresh.amazon.com/category?cat=spotlight&appendmp=true&ref=la_tt_fbaf_af, 4 pages.

"FAQ Ebay Now", May 14, 2014, retrieved from http:/www.ebay.com/now/faq.html#question-block1, 2 pages.

"Membership Benefits, AmazonFresh", May 15, 2014, retrieved from https:/fresh.amazon.com/MembershipBenefits, 2 pages.

* cited by examiner

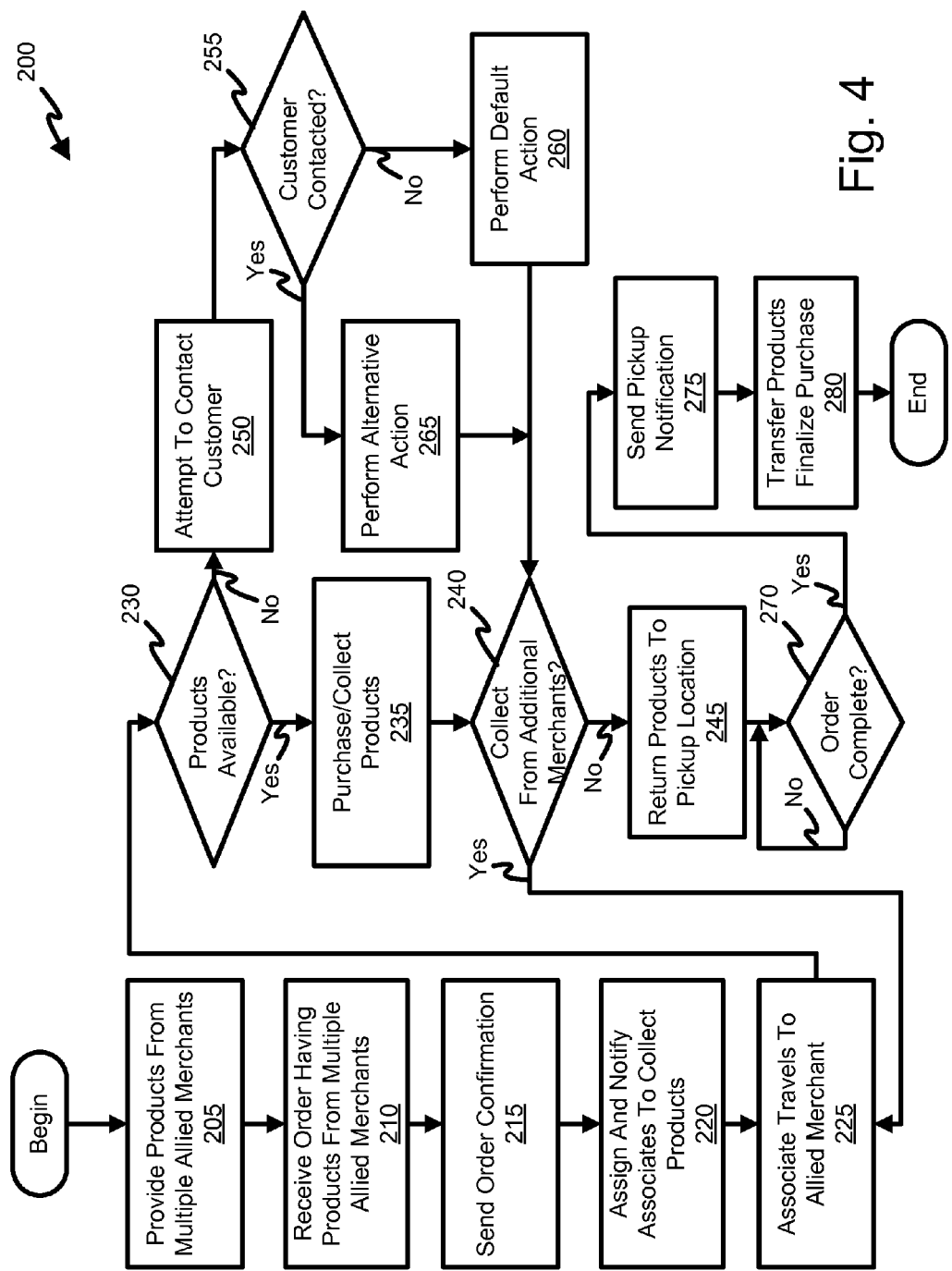

MERCHANDISE PICKUP SYSTEM, METHOD, AND MEDIA FOR ALLIED MERCHANTS

FIELD

Certain embodiments of the present disclosure relate to commercial services and, in particular, to merchandise pickup services.

BACKGROUND

Customers commonly visit multiple stores in order to acquire products they wish to purchase. Visiting multiple stores, however, is generally more time consuming than visiting a single store that stocks all products that the customer wishes to purchase. Some companies offer delivery of products in certain limited product categories, such as certain food products that may be selected and paid for online and delivered by vehicles dedicated to delivering products purchased from that particular merchant (e.g., groceries from Peapod). In such instances, the customer has access only to the inventory carried by that particular merchant, and must still shop elsewhere for missing products. Furthermore, delivery from such merchants generally takes a day or longer. As a result, if a customer desires immediate or near immediate possession of several products, the customer may be forced to visit one or more local merchants in order to find the desired products.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Systems, methods, and computer readable media are directed to filling customer orders that include products supplied by different merchants and providing such ordered products to the customer from a pickup location. Such systems, methods, and computer readable media are substantially shown in and/or described in connection with at least one of the figures, and are set forth more completely in the claims Advantages, aspects, and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 4 shows a flowchart of an example merchandise pickup process that may be implemented by the merchandise pickup system of FIG. 2.

DETAILED DESCRIPTION

Certain embodiments of the present disclosure relate to systems, methods, and computer readable media that support the fulfilling a customer order having products supplied by multiple merchants. More specifically, certain embodiments of the present disclosure relate to a system, method, or computer readable medium that receive a customer order, gather products for the customer order from multiple merchants, and provide such products for pickup at a pickup location.

As utilized herein, the terms "exemplary" or "example" means serving as a non-limiting example, instance, or illustration. As utilized herein, the term "e.g." introduces a list of one or more non-limiting examples, instances, or illustrations.

Figure 1:
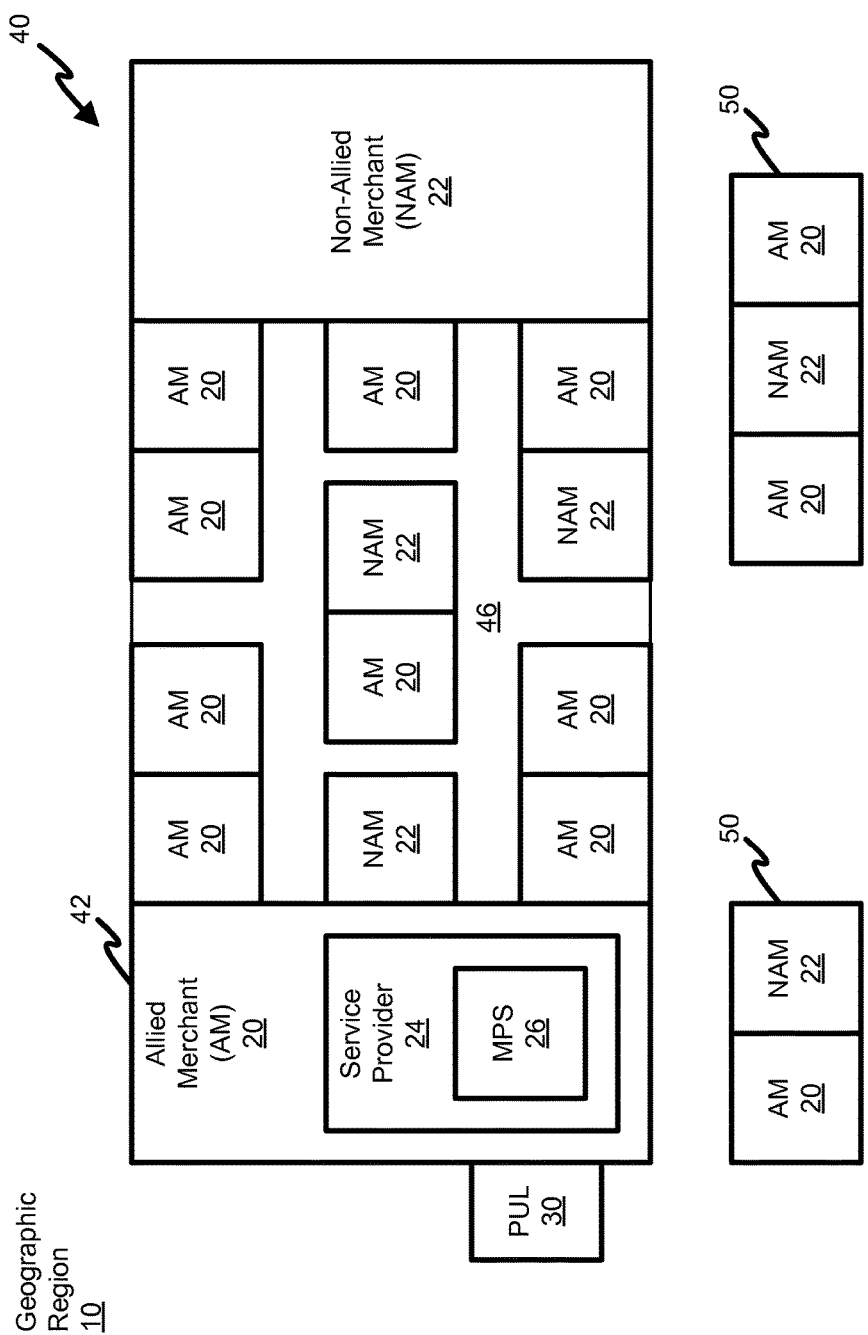
FIG. 1 shows a geographic region or service region that includes allied and non-allied merchants.

FIG. 1 shows a geographic region 10 having several allied merchant (AM) 20 and non-allied merchants (NAM) 22 within relatively close proximity of a pickup location (PUL) 30. As shown, the several merchants 20, 22 may be part of a shopping mall 40 that includes one or more buildings 42 which house shops or stores of the several merchants 20, 22. The shopping mall 40 may further provide walkways 46 that enable customers to walk between stores of the various merchants 20, 22. Satellite buildings 50 may also be in close proximity to the shopping mall 40 and may likewise provide stores for one or more merchants 20, 22.

In some embodiments, merchants may sign-up, subscribe, or otherwise become allied with a service provider 24 which provides a merchandise pickup service for allied merchants 20 in the geographic region 10. For one reason or another, one or more merchants 22 may not be allied with the service provider 24. As such, the geographic region 10 may include both allied merchants 20 and non-allied merchants 22. Furthermore, while service provider 24 is depicted as a part of one of the allied merchants 20, the service provider 24 may be an entity that is separate from any of the merchants 20, 22.

The service provider 24 may utilize a merchandise pickup (MP) system 26 that aids in providing the merchandise pickup service to the allied merchants 20. In particular, the MP system 26 may receive customer orders for products provided by allied merchants 20 in the geographic region 10. In some embodiments, the MP system 26 may cause the ordered products to be collected from the allied merchants 20 shortly after placement of the order (e.g., within an hour) to permit customers to pickup their ordered products from the pickup location 30 the same day they placed the order. In this manner, the MP system 26 may enable a customer to purchase products from multiple allied merchants 20 without requiring the customer to physically visit stores for each allied merchant 20.

In one embodiment, the geographic or service region 10 is predetermined or specified in a manner that permits same day collection and pickup from pickup location 30. In particular, the service provider 24 and MP system 26 may use associates to collect the products from the allied merchants 20 in the predetermined region 10. As such, the predetermined region 10 is defined in a manner that reasonably permits the associate or a team of associates to travel to the various allied merchants 20 to collect products and return such collected products to the pickup location 30. The associates may use various forms of travel (e.g., bicycles, scooters, cars, trucks, buses, subways, etc) to travel between allied merchants 20 and pickup location 30. However, in one embodiment, the associates merely walk between the allied merchants 20 and pickup location 30 in order to collect the ordered products. In such an embodiment, the predetermined geographic region 10 may be quite small and may include only those merchants 20, 22 in the immediate vicinity of the pickup location 30 (e.g., only merchants in a particular shopping mall 40). While other forms of transportation may enable the service provider 24 to increase the size of the geographic or service region 10, the service provider 24 may need to weigh the cost and liability associated with the use of such modes of transportation to determine whether the increased service area is worth the additional expense.

Figure 2:
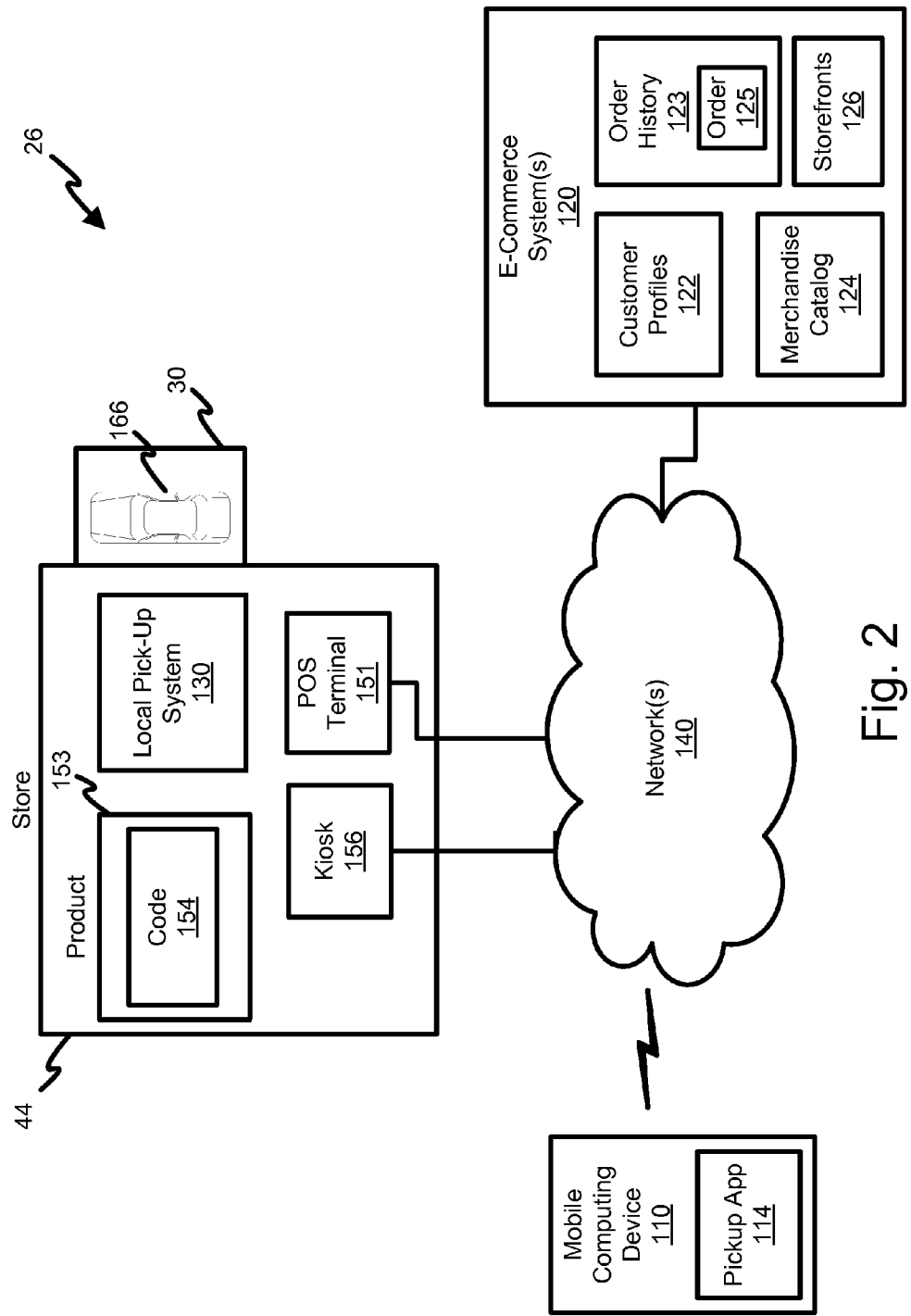
FIG. 2 shows an example merchandise pickup system for use with the allied merchants of FIG. 1.

Referring to FIG. 2, an exemplary MP system 26 is depicted. As shown, the MP system 26 may include a mobile computing device 110 connected to an e-commerce system 120 and a local pickup (LP) system 130 via one or more networks 140. The networks 140 may include a number of private and/or public networks such as, for example, wireless and/or wired LAN networks, cellular networks, and the Internet that collectively provide a communication path and/or paths between the mobile computing devices 110, the e-commerce system 120, and the LP system 130.

The mobile computing devices 110 may include tablets, smart phones, mobile phones, personal data assistants, handheld gaming consoles, and/or other forms of mobile computing devices which enable a user to communicate with the e-commerce system 120 and/or MP system 130 via the network 140. As shown, the mobile computing device 110 may include a merchandise pickup (MP) application 114. The application 114 may comprise instructions that, in response to being executed by the mobile computing device 110, cause the mobile computing device 110 to perform various tasks associated with the merchandise pickup process described below. In some example embodiments, the mobile computing device 110 may download the application 114 from various online application stores. Moreover, while depicted in FIG. 2 as a separate application, the merchandise pickup functionality of application 114 may be incorporated into a larger application with additional functionality.

The e-commerce system 120 may include one or more web servers, database servers, routers, load balancers, and/or other computing and/or networking devices. The e-commerce system 120 may maintain customer profiles 122 and order histories 123 for various customers that utilize the pickup services provided by the MP system 26. The order histories 123 may include details regarding each order 125 placed by the customer. Moreover, the e-commerce system 120 may maintain a merchandise catalog 124 that includes information regarding products 153 for sale by each allied merchant 20.

Furthermore, the e-commerce system 120 may provide one or more online storefronts 126 that permit customers to purchase products 153 using a computing device. In some embodiments, one or more of the storefronts 126 are publicly accessible via a public network such as the Internet thus permitting customers to purchase products 153 from such storefronts 126 from the comfort of their homes or from other locations. In some embodiments, one of more of the storefronts 126 are not publicly accessible but limited to computing devices such as kiosk 156 within the store 44.

As shown, the store 44 may include point-of-sale (POS) terminals 151 and the MP system 130. The MP system 130 may include one or more web servers, database servers, routers, load balancers, and/or other computing and/or networking devices. As explained in greater detail below with respect to the merchandise pickup process of FIG. 4, the LP system 130 may facilitate the pickup of purchased merchandise, and may, in particular, permit customers to pickup merchandise from a designated pickup location 30.

As shown in FIG. 2, the pickup location 30 may be a curbside location adjacent or near the store 44. In other embodiments, the pickup location 30 may not be proximate the store 44 or curbside. For example, the pickup location 30 may correspond to a designated area of a parking lot which is distant from the store 44 or may correspond to a particular customer service counter, kiosk, or other location within the store 44.

The store 44 may further include numerous merchandise products 153, which are on display for purchase by customers of the store 44. For example, the store 44 may include shelves, clothing racks, tables, and/or other assemblies upon which merchandise products 153 may be placed in a customer accessible manner so that the customer may physically interact with the products 153. More specifically, the store 44 may display the products 153 in a manner which permits a customer to pickup the products 153 they want to purchase and place them in a shopping basket or wheeled shopping cart. The customer may then carry the selected products 153 to a POS terminal 151 where a store associate may scan codes 154 of the selected products 153, determine a total purchase price for the selected products 153, and receive payment from the customer for the selected products 153. The POS terminal 151 may further provide details regarding the purchased products to the e-commerce system 120 so that the e-commerce system 120 may update the customer's order history 123. Besides supporting sales via POS terminals 151, the store 44 may further permit the sale of products 153 via mobile computing device 110, kiosks 156, and/or one or more online storefronts 126 provided by the e-commerce system 120.

FIG. 2 depicts an example embodiment of the MP system 26. However, the MP system 26 may be implemented in numerous different manners using a wide range of different computing devices, platforms, networks, etc. Moreover, aspects of the MP system 26 may be implemented using a client/server architecture, a peer-to-peer (P2P) architecture, and/or another networking architecture. Such embodiments are envisioned and protection for such embodiments is sought to the extent encompassed by the appended claims.

Figure 3:
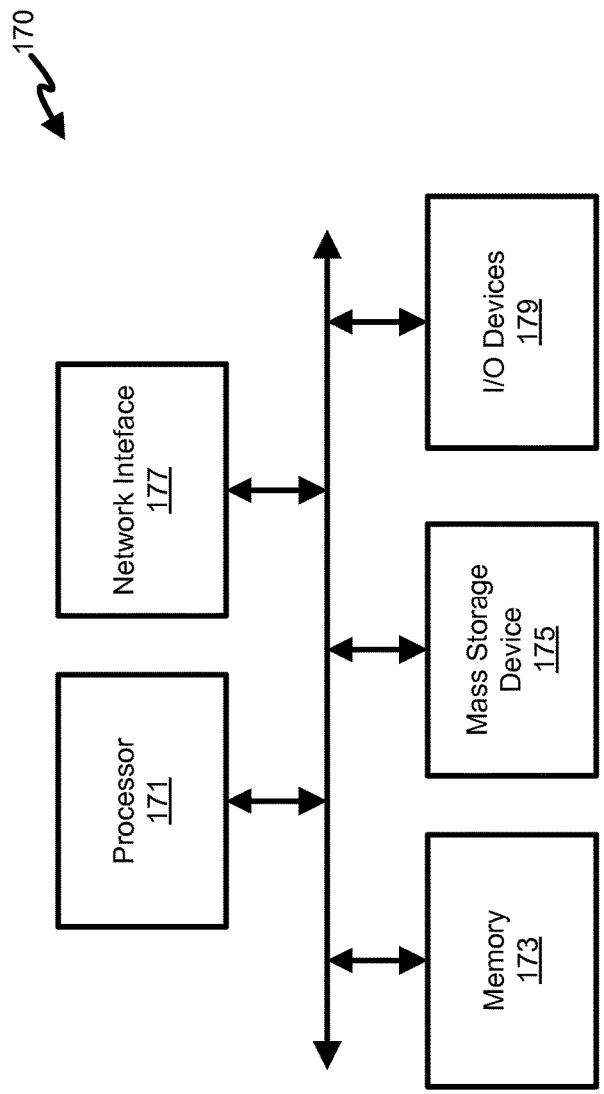
FIG. 3 shows an example computing device suitable for implementing one or more aspects of the merchandise pickup system shown in FIG. 2.

In some embodiments, the mobile computing device 110, the e-commerce system 120, POS terminals 151, kiosks 156, and/or LP system 130 may be implemented using various types of computing devices. FIG. 3 provides a simplified depiction of a computing device 170 suitable for such aspects of the MP system 26. As shown, the computing device 170 may include a processor 171, a memory 173, a mass storage device 175, a network interface 177, and various input/output (I/O) devices 179. The processor 171 may be configured to execute instructions, manipulate data and generally control operation of other components of the computing device 170 as a result of its execution. To this end, the processor 171 may include a general purpose processor such as an x86 processor or an ARM processor which are available from various vendors. However, the processor 171 may also be implemented using an application specific processor and/or other circuitry.

The memory 173 may include various types of random access memory (RAM) devices, read only memory (ROM) devices, flash memory devices, and/or other types of volatile or non-volatile memory devices. In particular, such memory devices of the memory 173 may store instructions and/or data to be executed and/or otherwise accessed by the processor 171. In some embodiments, the memory 173 may be completely and/or partially integrated with the processor 171.

In general, the mass storage device 175 may store software and/or firmware instructions which may be loaded in memory 173 and executed by processor 171. The mass storage device 175 may further store various types of data which the processor 171 may access, modify, and/otherwise manipulate in response to executing instructions from memory 173. To this end, the mass storage device 175 may comprise one or more redundant array of independent disks (RAID) devices, traditional hard disk drives (HDD), sold state device (SSD) drives, flash memory devices, read only memory (ROM) devices, and/or other types of non-volatile storage devices.

The network interface 177 may enable the computing device 170 to communicate with other computing devices via network 140. To this end, the networking interface 177 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc) or near field communication (NFC) interface, and/or some other type of networking interface capable of providing a communications link between the computing device 170 and network 140 and/or another computing device.

Finally, the I/O devices 179 may generally provide devices which enable a user to interact with the computing device 170 by either receiving information from the computing device 170 and/or providing information to the computing device 170. For example, the I/O devices 179 may include display screens, keyboards, mice, touch screens, microphones, audio speakers, digital cameras, optical scanners, RF transceivers, etc.

While the above provides some general aspects of a computing device 170, those skilled in the art readily appreciate that there may be significant variation in actual implementations of a computing device. For example, a smart phone implementation of a computing device generally uses different components and may have a different architecture than a database server implementation of a computing device. However, despite such differences, computing devices generally include processors that execute software and/or firmware instructions in order to implement various functionality. As such, the above described aspects of the computing device 170 are not presented from a limiting standpoint but from a generally illustrative standpoint. The present application envisions that aspects of the present application may find utility across a vast array of different computing devices and the intention is not to limit the scope of the present application to a specific computing device and/or computing platform beyond any such limits that may be found in the appended claims.

Referring now to FIG. 4, a flowchart illustrates aspects of an example merchandise pickup process 200 that may be implemented by the MP system 26. In general, the MP system 26 per the method 200 may fulfill one or more received customer orders for products provided by one or more allied merchants 20. In particular, the MP system 26 may cause ordered products to be acquired from one or more allied merchants 20 and delivered to the pickup location 30. Per the method 200, customers may then pickup the acquired products from the pickup location 30 regardless of the allied merchants 20 from which products were acquired. Thus, the MP system 26 may permit a customer to purchase products from multiple allied merchants 20 by placing a single order in a manner explained below and later picking-up such order products from the pickup location 30 without physically visiting each allied merchant 20.

At 205, the MP system 26 may provide a customer with product listings for products from one or more allied merchants 20 so that the customer may order and select such products. To this end, the customer may use a mobile computing device 110, kiosk 156, or another computing device to access the e-commerce system 120 and one or more storefronts 126 provided by the e-commerce system 30. Via the computing device and the storefronts 126, the customer may select products 153 from merchandise catalogs 124 of the allied merchants 20. After selecting products 153, the customer at 210 may place the order 125 with the e-commerce system 30, thus causing the e-commerce system 120 to receive the order 125 and forward the order to the MP system 26 associated with the allied merchants 20. In one embodiment, the e-commerce system 120 may handle orders 125 for allied merchants 20 of multiple geographic regions 10. As such, the e-commerce system 120 may permit the customer to select a pickup location 30 during the process of placing the order at 210. The e-commerce system 120 may also determine an appropriate pickup location 30 for the placed order 125 based on the allied merchants 20 from which the customer ordered products 153, based on a profile 122 maintained for the customer, and/or based on some other mechanism.

After placing the order 125, the e-commerce system 120 and/or the MP system 26 at 215 may send the customer a confirmation that the order 125 was received. In particular, the e-commerce system 120 and/or MP system 26 may send the customer an email message that includes an itemized listing of the products 125 ordered as well as an explanation of the pickup process. For example, the email message may provide the customer with an estimated time by which the order 125 will be ready for pickup and may inform the customer that a pickup notification will be sent once the order 125 is ready for pickup at the pickup location 30. Other embodiments may provide confirmations and pickup notifications via various forms of communication besides an email message such as, for example, short message service (SMS) text messages, extensible messaging and presence protocol (XMPP) instant messages, push notifications to the application 24, telephone calls, etc.

At 220, the LP system 130 of the MP system 26 may assign one or more associates to the received order 125. Moreover, the LP system 130 may notify and request the assigned associates that the ordered products 153 be collected from the allied merchants 20 and returned to the pickup location 30. In some embodiments, the associates tasked with collecting ordered products 153 may each have an associated mobile computing device 110 such as a tablet. The LP system 130 may notify an associate of the order 125 via the associated mobile computing device. While the LP system 130 may simply assign an order 125 to an available associate as the orders 125 arrive, the LP system 130 may also collect orders 125 in batches and intelligently assign products 153 for pickup to the available associates.

For example, the LP system 130 may receive multiple orders 125 within a short time that all include products 153 from a particular allied merchant 20. Instead of assigning each order to a separate associate, thus resulting in multiple associates traveling to the same allied merchant 20, the LP system 130 may assign to a single associate the task of collecting products 153 from the particular allied merchant 20 despite the products 153 corresponding to multiple orders 125 possibly from multiple customers. By intelligently assigning the task of collecting products 153 from the allied merchants 20, the LP system 130 may make more efficient use of the associates tasked with collecting products 153.

In a similar vein, the LP system 130 may track associates in the field and assign products 153 to be picked up from an allied merchant 20 to an associate who is in the process of traveling to a store of the allied merchant 20 or who may already be located at a store of the allied merchant 20. Such tracking of associates in the field may be accomplished by tracking of a geographic location of a mobile computing device 110 associated with each associate in the field, by receiving updates from the associates in the field via their associated mobile computing device 110, and/or by other mechanisms. Furthermore, the LP system 130 may inform such associates in the field of the newly assigned products 153 to be picked up from the allied merchant 20 by providing the associate an updated pick list via their associated mobile computing device 110.

At 225, the associate or associates may travel (e.g., walk) to a store 44 of a respective allied merchant 20 to purchase ordered products 153 on behalf of the customer or customers. In one embodiment, the e-commerce system 120 attempts to maintain real-time or near real-time availability of products 153 in the merchandise catalogs 124 of the respective allied merchants. Regardless of whether real-time availability is maintained, the associate at 230 may find upon arriving at the store 44 of an allied merchant 20 that one or more of the ordered product 153 are not available.

If the all the ordered products 153 are available, then the associate at 235 may purchase the ordered products 153 from the allied merchant 20 on behalf of the customer. After purchasing the products 153 from the allied merchant, the associate at 240 may determine whether the associate has been tasked with collecting products 153 from other allied merchants 20. If so, the associate at 225 may travel to another allied merchant 20 in order to purchase further products 153 on behalf the customer or customers. Otherwise, the associate may return to the pickup location 30 at 245 and place the products 153 in respective bins or lockers for safe keeping of the products 153 until the customer or customers are able to pickup their ordered products 153.

If the associate at 230, however, determines that the ordered product 153 is not available, the associate at 250 may attempt to contact the customer to obtain customer authorization for an alternative course of action. Such customer contact may be made via one or more forms of communication such as, for example, email messages, SMS text messages, XMPP instant messages, push notifications to the application 24, telephone calls, etc. For example, the associate at 250 may call the customer and inform the customer that the ordered product 153 is not available.

If the associate at 255 is unable to contact the customer within a reasonable time period (e.g., 10 minutes), then the associate at 260 may proceed with a default course of action. For example, the associate may purchase the ordered products 153 that are available. On the other hand, if the associate is able to contact the customer, then the associate at 265 may provide the customer with one or more alternative courses of action and execute the alternative course of action authorized by the customer. For example, the associate may suggest (i) the purchase an alternative, available product 153 in lieu of the unavailable, ordered product 153, (ii) the removal of the unavailable, ordered product 153 from the order 125, or (iii) backordering the unavailable, ordered product 153 for pickup at a future date. After executing the default or alternative course of action, the associate at 240 may determine whether to return the products 153 to the pickup location 30 or to proceed to additional stores 44 of allied merchants 20 in order to collect further products 153.

At 270, the LP system 130 may determine whether a particular order 125 is ready for pickup. The LP system 130 may make such determination based on updates received from the associates as they purchase products 153 from the stores and/or return products 154 to the pickup location 30. For example, an associate may provide updates to the LP system 130 via an associated mobile computing device 110 that indicates which products 153 have been collected and which products 153 the associate was unable to collect. In another embodiment, instead of the LP system 130 determining whether an order 125 is ready for pickup, an associate may inform the LP system 130 that an order 125 is ready for pickup.

Regardless of how the determination is made, the LP system 130 at 275 may provide the customer with a pickup notification when the order 125 is ready for pickup. Again, the LP system 130 may provide the pickup notification via various forms of communication such as, for example, an email message, an SMS text message, an XMPP instant message, a push notifications to the application 24, a telephone call, etc.

In response to receiving the pickup notification, the customer may travel to the pickup location 30 and pickup the products 153 ordered from the allied merchants. To this end, the customer and an associate manning the pickup location 30 may finalize the order at 280. In particular, the associate may confirm the identity of the customer to ensure the products 153 are delivered to the appropriate customer. Moreover, the associate may collect payment from the customer for the ordered products if not already collected when the order was placed at 210 or if alternate products purchased at 265 have increased the total purchase price beyond the previously collected payment. Conversely, the associate may provide the customer with a refund if the total purchase price was less than the previously collected payment due to unavailable products 153 or lower cost, alternate products purchased at 265.

Although devices, methods, and systems according to the present disclosure may have been described in connection with a preferred embodiment, it is not intended to be limited to the specific form set forth herein, but on the contrary, it is intended to cover such alternative, modifications, and equivalents, as can be reasonably included within the scope of the disclosure. For example, as noted above, the LP system 130 may be provided by one of the merchants 20. As such, the associates may not need to travel to the merchant 20 providing the LP system 130 in order to collect products 153. Moreover, the associate may not need to purchase products of such an allied merchant 20 since the allied merchant 20 will receive payment directly from the customer. Similarly, in some embodiments, the associate may not need to purchase products from any of the allied merchants 20. Instead, the service provider 24 via the LP system 130 may simply track products 153 collected from each of the allied merchants 20 and periodically pay the allied merchants 20 for the products 153 collected from their respective stores 44.

Aspects of the present disclosure may be realized in hardware, software, or a combination of hardware and software. Aspects of the present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
    receiving, from a customer via a computing device, an order comprising products from multiple allied merchants within a predetermined geographic region;
    associating a plurality of mobile computing devices with a plurality of associates;
    receiving geographic location updates from each mobile computing device of the plurality of mobile computing devices, each geographic location update indicative of a geographic location for a mobile computing device that originated the respective geographic location update;
    tracking a geographic location for each associate of the plurality of associates via geographic location updates received from a respective mobile computing device associated with each associate;
    assigning, based on the tracked geographic locations for the plurality of associates, one or more associates to purchase the products from the multiple allied merchants and return the purchased products to a pickup location, wherein said assigning comprises:
        determining, based on the tracked geographic locations for the plurality of associates, that an associate is in route to an allied merchant;
        assigning, to the associate determined to be in route to the allied merchant, one or more products from the order for purchase from the allied merchant; and
        informing the associate, via the mobile computing device associated with the associate, of the one or more products assigned to the associate for purchase from the allied merchant;
    requesting, the associate via the mobile computing device associated with the associate, to purchase and return an alternative product to the pickup location in lieu of an unavailable product of the order;
    adjusting an amount to be collected based on the alternative product purchased in lieu of the unavailable product of the order; and
    sending a pickup notification to the customer that indicates the products of the order are ready for pickup from the pickup location.

2. The method of claim 1, wherein said receiving comprises receiving the order via a storefront provided by an e-commerce system.

3. The method of claim 1, further comprising determining whether the order is ready for pickup based upon updates received from the mobile computing devices associated with the one or more associates.

4. The method of claim 1, wherein said sending a pickup notification comprises sending the pickup notification to the customer via the computing device after determining that the order is ready for pickup from the pickup location.

5. A non-transitory computer readable media, comprising a plurality of instructions, that in response to being executed, result in a pickup system:
    receiving, from a customer via a computing device, an order comprising products from multiple allied merchants within a predetermined geographic region;
    associating a plurality of mobile computing devices with a plurality of associates;
    receiving geographic location updates from each mobile computing device of the plurality of mobile computing devices, each geographic location update indicative of a geographic location for a mobile computing device that originated the respective geographic location update;
    tracking a geographic location for each associate of the plurality of associates via geographic updates received from a respective mobile computing device associated with each associate;
    assigning, based on the tracked geographic locations for the plurality of associates, one or more associates to purchase the products from the multiple allied merchants and return the purchased products to a pickup location, wherein said assigning comprises:
        determining, based on the tracked geographic locations for the plurality of associates, that an associate is in route to an allied merchant;
        assigning, to the associate determined to be in route to the allied merchant, one or more products from the order for purchase from the allied merchant; and
        informing the associate, via the mobile computing device associated with the associate, of the one or more products assigned to the associate for purchase from the allied merchant;
    requesting, an associate via the mobile computing device associated with the associate, to purchase and return an alternative product to the pickup location in lieu of an unavailable product of the order;
    adjusting an amount to be collected based on the alternative product purchased in lieu of the unavailable product of the order; and
    sending a pickup notification to the customer that indicates the products of the order are ready for pickup from the pickup location.

6. The non-transitory computer readable media of claim 5, wherein the plurality of instructions further result in the pickup system receiving the order via a storefront provided by an e-commerce system.

7. The non-transitory computer readable media of claim 5, wherein the plurality of instructions further result in the pickup system determining whether the order is ready for pickup based upon updates received from the mobile computing devices associated with the one or more associates.

8. The non-transitory computer readable media of claim 5, wherein the plurality of instructions further result in the pickup system sending the pickup notification to the customer via the computing device after determining that the order is ready for pickup from the pickup location.

9. A merchandise pickup system, comprising:
- an e-commerce system comprising one or more first processors that, in response to executing a plurality of first instructions, are configured to provide one or more storefronts for a plurality of allied merchants and receive, from a customer via a computing device, an order that comprises products from multiple allied merchants of the plurality of allied merchants; and
- a local pickup system comprising one or more second processors that, in response to executing a plurality of second instructions, are configured to
  - receive the order from the e-commerce system, associate a plurality of mobile computing devices with a plurality of associates,
  - receive geographic location updates from each mobile computing device of the plurality of mobile computing devices, each geographic location update indicative of a geographic location for a mobile computing device that originated the respective geographic location update,
  - track a geographic location for each associate of the plurality of associates via a respective mobile computing device associated with each associate,
  - assign, based on the tracked geographic locations for the plurality of associates, one or more associates to purchase the products from the multiple allied merchants and return the purchased products to a pickup location,
  - determine, based on the tracked geographic locations for the plurality of associates, that an associate is in route to an allied merchant,
  - assign, to the associate determined to be in route to the allied merchant, one or more product from the order for purchase from the allied merchant,
  - inform the associate, via the mobile computing device associated with the associate, of the one or more products assigned to the associate for purchase from the allied merchant,
  - request, an associate via the mobile computing device associated with the associate, to purchase and return an alternative product to the pickup location in lieu of an unavailable product of the order,
  - adjust an amount to be collected based on the alternative product purchased in lieu of unavailable products of the order, and
  - send a pickup notification to the customer that indicates the products of the order are ready for pickup from the pickup location.

10. The merchandise pickup system of claim 9, wherein said local pickup system is further configured to determine whether the order is ready for pickup based upon updates received from the mobile computing devices associated with the one or more associates.

11. The merchandise pickup system of claim 9, wherein said local pickup system is further configured to send a pickup notification to the customer via the computing device after determining that the order is ready for pickup from the pickup location.

12. A method, comprising:
- receiving, from a customer via a computing device, an order comprising products from multiple allied merchants within a predetermined geographic region;
- associating a plurality of mobile computing devices with a plurality of associates;
- receiving geographic location updates from each mobile computing device of the plurality of mobile computing devices, each geographic location update indicative of a geographic location for a mobile computing device that originated the respective geographic location update;
- tracking a geographic location for each associate of the plurality of associates via geographic location updates received from a respective mobile computing device associated with each associate;
- assigning, based on the tracked geographic locations for the plurality of associates, one or more associates to purchase the products from the multiple allied merchants and return the purchased products to a pickup location, wherein said assigning comprises:
  - determining, based on the tracked geographic locations for the plurality of associates, that an associate is located at an allied merchant;
  - assigning, to the associate determined to be located at the allied merchant, one or more products from the order for purchase from the allied merchant; and
  - informing the associate, via the mobile computing device associated with the associate, of the one or more products assigned to the associate for purchase from the allied merchant;
- requesting, the associate via the mobile computing device associated with the associate, to purchase and return an alternative product to the pickup location in lieu of an unavailable product of the order;
- adjusting an amount to be collected based on the alternative product purchased in lieu of the unavailable product of the order; and
- sending a pickup notification to the customer that indicates the products of the order are ready for pickup from the pickup location.

13. The method of claim 12, further comprising determining whether the order is ready for pickup based upon updates received from the mobile computing devices associated with the one or more associates.

14. The method of claim 12, wherein said sending a pickup notification comprises sending the pickup notification to the customer via the computing device after determining that the order is ready for pickup from the pickup location.

15. A non-transitory computer readable media, comprising a plurality of instructions, that in response to being executed, result in a pickup system:
- receiving, from a customer via a computing device, an order comprising products from multiple allied merchants within a predetermined geographic region;
- associating a plurality of mobile computing devices with a plurality of associates;
- receiving geographic location updates from each mobile computing device of the plurality of mobile computing devices, each geographic location update indicative of a geographic location for a mobile computing device that originated the respective geographic location update;
- tracking a geographic location for each associate of the plurality of associates via geographic updates received from a respective mobile computing device associated with each associate;
- assigning, based on the tracked geographic locations for the plurality of associates, one or more associates to purchase the products from the multiple allied merchants and return the purchased products to a pickup location, wherein said assigning comprises:
  - determining, based the tracked geographic locations for the plurality of associates, that an associate is located at an allied merchant;

assigning, to the associate determined to be located at the allied merchant, one or more products from the order for purchase from the allied merchant; and informing the associate, via the mobile computing device associated with the associate, of the one or more products assigned to the associate for purchase from the allied merchant;

requesting, an associate via the mobile computing device associated with the associate, to purchase and return an alternative product to the pickup location in lieu of an unavailable product of the order;

adjusting an amount to be collected based on the alternative product purchased in lieu of the unavailable product of the order; and sending a pickup notification to the customer that indicates the products of the order are ready for pickup from the pickup location.

16. The non-transitory computer readable media of claim 15, wherein the plurality of instructions further result in the pickup system determining whether the order is ready for pickup based upon updates received from the mobile computing devices associated with the one or more associates.

17. The non-transitory computer readable media of claim 15, wherein the plurality of instructions further result in the pickup system sending the pickup notification to the customer via the computing device after determining that the order is ready for pickup from the pickup location.

18. A merchandise pickup system, comprising:
an e-commerce system comprising one or more first processors that, in response to executing a plurality of first instructions, are configured to provide one or more storefronts for a plurality of allied merchants and receive, from a customer via a computing device, an order that comprises products from multiple allied merchants of the plurality of allied merchants; and a local pickup system comprising one or more second processors that, in response to executing a plurality of second instructions, are configured to
receive the order from the e-commerce system, associate a plurality of mobile computing devices with a plurality of associates, receive geographic location updates from each mobile computing device of the plurality of mobile computing devices, each geographic location update indicative of a geographic location for a mobile computing device that originated the respective geographic location update, track a geographic location for each associate of the plurality of associates via a respective mobile computing device associated with each associate, assign, based on the tracked geographic locations for the plurality of associates, one or more associates to purchase the products from the multiple allied merchants and return the purchased products to a pickup location, determine, based on the tracked geographic locations for the plurality of associates, that an associate is located at an allied merchant, assign, to the associate determined to be located at the allied merchant, one or more products from the order for purchase from the allied merchant, inform the associate, via the mobile computing device associated with the associate, of the one or more products assigned to the associate for purchase from the allied merchant, request, an associate via the mobile computing device associated with the associate, to purchase and return an alternative product to the pickup location in lieu of an unavailable product of the order, adjust an amount to be collected based on the alternative product purchased in lieu of unavailable products of the order, and send a pickup notification to the customer that indicates the products of the order are ready for pickup from the pickup location.

19. The merchandise pickup system of claim 18, wherein said local pickup system is further configured to determine whether the order is ready for pickup based upon updates received from the mobile computing devices associated with the one or more associates.

20. The merchandise pickup system of claim 18, wherein said local pickup system is further configured to send a pickup notification to the customer via the computing device after determining that the order is ready for pickup from the pickup location.

* * * * *